April 29, 1930.                M. G. TORSON                1,756,108
                       SIGNALING SYSTEM FOR AUTOMOBILES
                   Filed Feb. 21, 1924        2 Sheets-Sheet 2

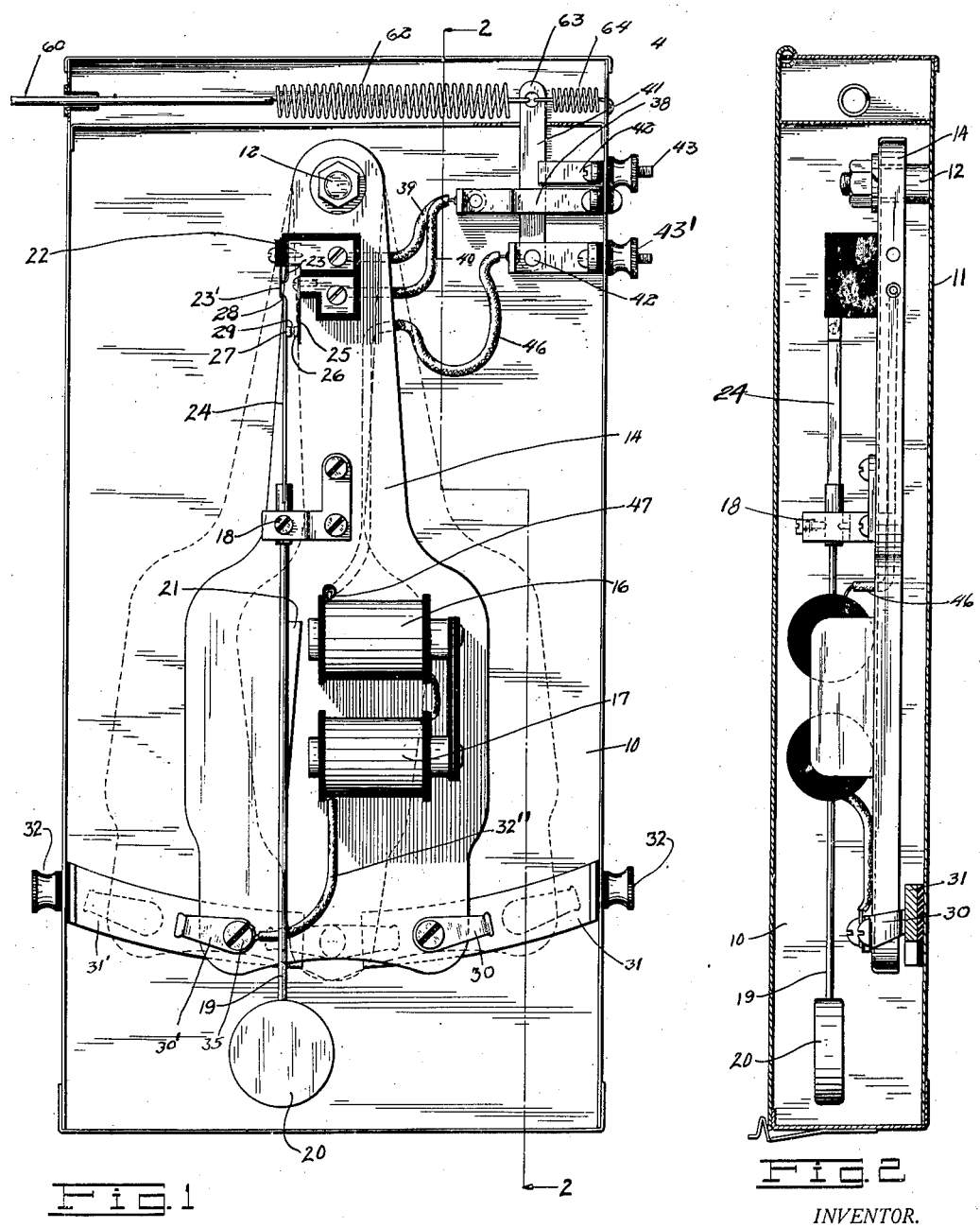

INVENTOR.
MARTIN G TORSON
BY
ATTORNEY.

Patented Apr. 29, 1930

1,756,108

UNITED STATES PATENT OFFICE

MARTIN G. TORSON, OF KANSAS CITY, KANSAS

SIGNALING SYSTEM FOR AUTOMOBILES

Application filed February 21, 1924. Serial No. 694,280.

This invention relates to signal lights for automobiles.

The general object is to provide an improved means for controlling the tail light of an automobile whereby the latter will be caused to blink or flicker.

One of the specific objects of the invention is to provide an improved means for blinking a signal light on an automobile wherein the normal tail light circuit can be utilized to control the blinking.

Another object of the invention is to provide an electro-magnetic blinking mechanism for an electric circuit including a circuit making and breaking mechanism which may be incorporated on the frame of the well known door bell ringer.

An additional object of the invention is to provide an improved means for blinking the tail light of an automobile wherein the operation of the brake causes the normal circuit to the tail light to be broken and an auxiliary circuit including the blinker to be closed to cause the tail light to blink.

Another object of the invention is to provide an automobile signal operating mechanism including a swinging electro-magnetic blinker for operating a signal light.

A further object of the invention is to provide an improved two-way switch for use in electric circuits.

Figure 6:
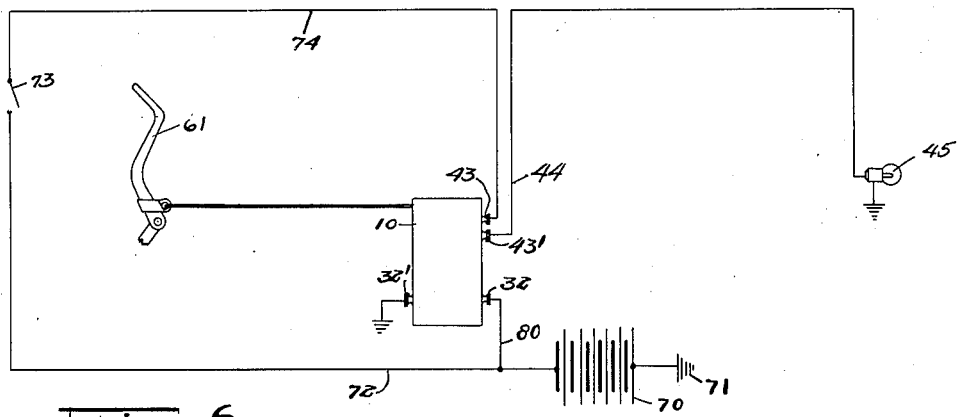
Figures 3, 4:
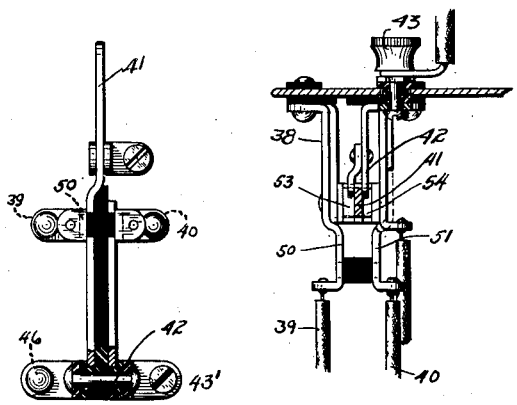
Figure 5:
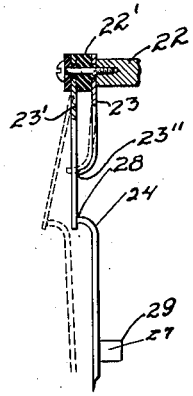

Other objects of the invention will be apparent from the following description taken in connection with the accompanying drawings wherein Fig. 1 is an elevation of an electro-magnetic blinker embodying the features of my invention; Fig. 2 is a side elevation of the blinker showing the housing in section; Fig. 3 is an elevation partly in section showing the two-way switch; Fig. 4 is a top plan view of the two-way switch; Fig. 5 is a detail of the circuit closing mechanism and Fig. 6 is a wiring diagram.

Referring to the drawings by reference characters, I have shown my improved means for controlling an automobile signal in Fig. 1. The device comprises a housing 10 having a back portion 11. Pivotally mounted upon the back portion 11, on an insulated pivot 12, I show a frame 14. The frame 14 closely resembles the ordinary door bell frame and has electro-magnets 16. 17 mounted thereon.

Pivotally or otherwise mounted upon the frame at 18 I show a pendulum rod 19 having a weight 20 at the lower end thereof. The pendulum is arranged adjacent the poles of the electro-magnets 16 and 17 and is provided with an armature 21 opposite the poles.

Secured upon the back 11 of the housing I show a circuit closing member 22. This circuit closing member is provided with a contact member 22'. The contact member 22' comprises two separately mounted members 23 and 23' which are resiliently mounted independently of each other and are insulated from each other. The contact member 23 is curved at its lower end 23" where it engages the contact member 23'. This last member 23' extends beyond the end of the contact member 23, and is adapted to be engaged by a circuit closing member 24 which is indicated as secured upon the pendulum rod 19.

The contact members 23 and 23' are so constructed that when they are in the position shown in solid lines in Fig. 5 a circuit is complete through the member 23' to the member 23. When the member 23' is in its normal position the member 23 bears slightly against the member 23'. When, however, the member 23' moves to the left to the dotted line position shown in Fig. 5 the member 23 moves only a short distance with the member 23' and thereafter separates from this member thus breaking the circuit.

By referring to Fig. 1 of the drawings it will be seen that as the pendulum swings to the right in this figure the circuit closing member 24 will swing to the left and will carry with it the member 23' thus breaking the circuit to the member 23. The arrangement of parts is such that when the armature 21 approaches very closely to the magnets 16 the circuit closing member 24 will move to the dotted line position shown in Fig. 5.

Mounted upon the circuit closer 22 I show a contact member 25 which is provided with a contact portion 26 adapted to be engaged by a contact member 27 arranged upon the member 24. As the pendulum oscillates it will be seen that contact is made at 28 when the pendulum swings to one extreme position, and at 29 when the pendulum swings to the other extreme position.

The top portion of the resilient member 24 is preferably curved as shown in Figs. 1 and 5. As a result when the closer 24 moves to the left Fig. 1 the parts 23' and 24 are in firm electric contact. As the closer 24 continues its movement to the left the member 23' will be separated from the member 23 thus breaking the circuit and discharging the electric magnets and causing the closer 24 to begin its reverse movement. When, however, the closer 24 moves to the right in Fig. 5 the parts 23' and 24 become separated so that there is no passage of current through the circuit. As the member 24 moves to the right in Fig. 5 the members 23 and 23' are again brought together.

The housing 10 is adapted to be arranged upon an automobile with the axis 12 of the pivoted frame member 14 extending longitudinally of the automobile. The arrangement is such that as the automobile body turns about its longitudinal axis when the wheels strike a rut the frame 14 may swing laterally without disturbing the relation of the contact closing members 23 and 24.

In order to damp the swinging motion of the frame, I provide springs 30 and 30' arranged at opposite sides of the frame 14. Each spring engages a plate 31 and 31' secured at each side of the back of the housing. The pressure of the springs 30 and 30' against the plates 31 and 31' is not sufficient to retard the swinging of the frame, but is just sufficient to damp the swinging action.

The plates 31 and 31' are each constructed of metal which is a good conductor of electricity. The plate 31 at the right in Fig. 1 is provided with a binding post 32 which is electrically connected with the plate 31 while the spring 30 has electric contact with the frame 14. The frame 14 is preferably made of material which is a good conductor of electricity and the pivoted member 18 which supports the pendulum as well as the pendulum itself is likewise a conductor of electricity so that there is a circuit through the binding post 32, the spring 30, the frame 14, the pivoted member 18 and to the circuit closer 24. The spring 30' at the left of Fig. 1 is mounted on a fastening member 35 in such a manner that the spring 30' is insulated from the frame 14. The plate 31' at the left of Fig. 1 is in circuit with the spring 30' and is provided with a binding post 32' as shown.

The circuit closer 22 is connected to a two-way switch 38 by two leads 39 and 40. The lead 39 is connected with the contact member 25 while the lead 40 is connected to the contact member 23. The circuit closer 38 is provided with a closing member 41 which is pivoted at 42ª to swing laterally between two pivot contacts 42ᵇ and 42ᶜ.

The closing member 41 is of metal or material of good electric conductivity with the upper part insulated from the lower part at 42ᵈ and in one position is adapted to engage a contact member 42 which has a binding post 43 thereon which is in circuit by means of a lead 74 with a switch 73 of the automobile. The closing member 41 is also electrically connected by means of a contact portion 53 with the pivot contact 42ᵇ which is connected by a lead 46 to the wiring 47 on the magnets 16 and 17. This wiring as stated is also connected by means of the pivot contact 42ᵇ which is connected by a lead 32'' with the fastening member 35.

The closing member 41 is adapted in one position to close the circuit through the binding post 43' to the lamp 45, that is, when the closing member is moved to the right in Fig. 1. When the closing member is moved to the left in Fig. 1 it makes contact with the terminals of the leads 39 and 40. By referring to Figs. 3 and 4 the details of the two-way switch 38 will be apparent. By referring to these figures it will be seen that the lead 39 is connected to a contact member 50 while the lead 40 is connected to a contact member 51. The part of the circuit closer 41 which is adjacent to the contacts 50 and 51 is provided with the contacting portion 53 and another portion 54. These portions 53 and 54 are insulated from each other and the portion 53 is shorter than the portion 54 (see Fig. 3) so that it does not engage the contact 42. As stated the portion 53 is electrically connected to the lead 46 while the portion 54 is electrically connected to the binding post 43'.

In Fig. 4 the operating member 41 is shown as in engagement with the contact 42. When the operating member 41 is moved downwardly in Fig. 4 (or to the left in Fig. 1) the contact members 53 and 54 engage respectively the contacts 50 and 51 and thus complete the circuit through the leads 39 and 40 to each of the contacts 42' of the pivot 42ª.

It will thus be seen that when the pendulum hangs pendant and the operating member 41 is moved to the left in Fig. 1 the circuit is completed through the binding post 32, the plate 31, the spring 30, the frame 14, the pivot 18, the contact member 24, the contact members 23', 23, the lead 40, the contact 50, the contact 53, the contact 42ᵇ, the lead 46, the coils on the magnets 16 and 17, the lead 32'', the spring 30', the plate 31', the binding post 32', and to the ground which may be the frame of an automobile. When this circuit is complete the magnets 16 and 17 will be energized thereby drawing the armature 21 toward them. As soon as the armature 21 is in close proximity to the poles of the magnet the circuit will be broken at 23'' and the weight of the pendulum will cause the latter to swing, moving the armature 21 away from the poles of the magnets and causing on its return the top of the circuit closer 24 to disengage the circuit closer 23' until the contacts 26 and 27 are in engagement at 29. This action completes the circuit through the binding post 32, the plate 31, the spring 30, the frame 14, the pivot 18, the circuit closing member 24, the contacts 27, 26, the contact member 25, the lead 39, the contact member 51, the contact member 54, the contact 42° the binding post 43', the lead 44, and the lamp 45 to the ground.

From the foregoing description it will be apparent that the pendulum is caused to oscillate and at the same time to make and break the circuit to the tail light 45 thus causing the latter to be illuminated or blink each time the pendulum makes a complete forward and back movement.

In order to actuate the operating member 41 I provide a rod or wire 60 which is adapted to be connected to the foot brake 61 of an automobile.

A spring 62 connects the end of the rod 60 with the end 63 of the operating member while a second spring 64 connects the operating member with the housing. When the brake is moved forward the rod 60 moves with it thus distending the spring 62 and moving the operating member 41 to the left in Fig. 1, thus closing the circuit through the magnets and causing the tail light to blink. When the brake is released the spring 64 acts on the operating member 41 to pull this operating member until it engages the contact 42 thus breaking the circuit through the blinking device and opening the normal circuit to the tail light.

My invention is particularly adapted for use in connection with the ordinary tail light circuit of an automobile. Such a circuit is shown in Fig. 6 and may include the battery 70 grounded at 71 and having a lead 72 connected to a switch 73 on the instrument board of the automobile. From the switch 73 a lead 74 extends normally to the tail light 45. With my invention, however, the lead 74 extends from the switch 73 to the binding post 43 on the blinker mechanism while a second lead 44 extends from the binding post 43' to the lamp. During operation when the automobile brake is off the circuit is complete from the battery 70 to the lead 72 and switch 73, the lead 74, the contact 43, the contact 54, one of the pivot contacts 42°, the lead 44, to the lamp. When the brake 61 is on, the circuit for lighting the lamp is completed through the lead 80 to the binding post 32 thence through the blinker mechanism as previously described.

From the foregoing description it will be apparent that when the brake pedal 61 is moved forward the tail light will blink regardless of whether the switch 73 is open or closed.

My improved signal operating mechanism may be used in conjunction with the normal tail light circuit or if desired the blinking mechanism may be incorporated in the circuit of a stop light or other signal means for an automobile. The device is extremely easy to install and can be very economically manufactured. My system is highly efficient in use and can be maintained in an automobile at practically no expense.

Having thus described my invention, I claim:

1. In a device of the class described, a blinker comprising a housing, a frame pivotally mounted in said housing, an electromagnet carried on said frame, a pendulum mounted to swing on said frame and having an armature thereon, a circuit closer on said pendulum, means whereby the magnet may be energized to move the pendulum and a second switch adapted to be intermittently opened and closed by the movement of said pendulum.

2. An electro-magnetic blinker comprising a housing having a frame pivotally mounted therein, said frame having a magnet thereon, a pendulum mounted to swing on said frame and having an armature adjacent said magnet, a resilient contact member mounted on said pendulum, a contact piece on said frame and adapted to engage one part of said contact member, a second contact piece on said frame and adapted to engage another part of said contact member, a two-way switch, a lead extending from each of said contact pieces to the terminals of said switch, and another lead associated with said magnet and with one of the terminals of the switch.

3. An electro-magnetic blinker comprising a housing having a frame pivotally mounted thereon, said frame having a magnet thereon, a pendulum mounted to swing on said frame and having an armature adjacent said magnet, a contact member mounted on said pendulum, a contact piece on said frame and adapted to engage one part of said contact member, a second contact piece on said frame and adapted to engage another part of said contact member, said second contact piece comprising two resilient strips normally in engagement and adapted to be separated by said contact member when the pendulum moves, a two-way switch, a lead extending from each of said contact pieces to the terminal of said switch and another lead associated with said magnet and with one of the terminals of the switch.

4. An electro-magnetic blinker comprising a housing having a frame pivotally mounted thereon, said frame having a magnet thereon, a pendulum mounted to swing on said frame, and having an armature adjacent said magnet, a contact member mounted on said pendulum, a contact piece on said frame and adapted to engage one part of said contact member, a second contact piece on said frame and adapted to engage another part of said contact member, said second contact piece comprising two spaced strips mounted on said frame and having portions thereof normally in engagement, said strips being adapted to be separated by said contact member when the pendulum moves to one extreme position, a two-way switch, a lead extending from each of said contact pieces to the terminal of said switch and another lead associated with said magnet and with one of the terminals of the switch.

In testimony whereof, I hereunto affix my signature.

MARTIN G. TORSON.